United States Patent [19]

Iwami

[11] 4,167,173

[45] Sep. 11, 1979

[54] ROTARY INTERNAL COMBUSTION ENGINE

[76] Inventor: Tadakatsu Iwami, No. 374, Shikisai, Himeji-shi, Hyogo-ken, Japan

[21] Appl. No.: 816,549

[22] Filed: Jul. 18, 1977

[30] Foreign Application Priority Data

May 6, 1977 [JP] Japan .................................. 52/52360

[51] Int. Cl.² ............................................ F02B 53/04
[52] U.S. Cl. .............................. 123/219; 123/119 DB; 123/218
[58] Field of Search ............. 123/207, 218, 219, 75 B, 123/119 DB

[56] References Cited

U.S. PATENT DOCUMENTS

| | | | |
|---|---|---|---|
| 2,152,028 | 3/1939 | Church | 123/119 DB |
| 3,297,005 | 1/1967 | Lamm | 123/218 |
| 3,780,707 | 12/1973 | Cole | 123/219 |
| 3,913,541 | 10/1975 | Scott | 123/119 DB X |
| 4,003,346 | 1/1977 | Kohno | 123/219 |
| 4,023,535 | 5/1977 | Ishikawa | 123/219 |

Primary Examiner—Carlton R. Croyle
Assistant Examiner—Michael Koczo, Jr.
Attorney, Agent, or Firm—George B. Oujevolk

[57] ABSTRACT

A rotary internal combustion engine includes a housing having trochoidal inner periphery, a substantially triangular rotor having three arch-like peripheral faces and rotatably mounted within the housing, a recess of substantially spoon-like shape provided in each of the peripheral faces of the rotor, a fuel port provided in the housing in communication therewithin, and an elongated air intake port provided in the side wall of the housing so as to be opened and closed by a side face of the rotor according to the rotation thereof. The air intake port is inclined upwardly in the direction of rotation of rotor, and is disposed at such a relative position that it gradually moves towards the rear end portion of a combustion chamber defined by the inner periphery of the housing and each of the peripheral faces of the rotor. To the air intake port, may be connected means for adjusting the air flow in response to the operating mode of the engine.

1 Claim, 13 Drawing Figures

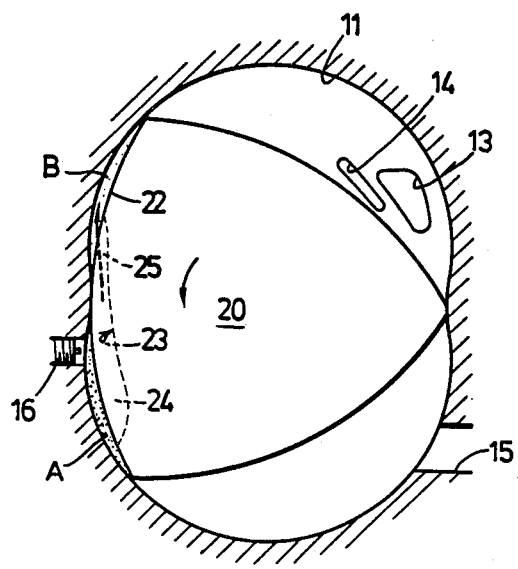
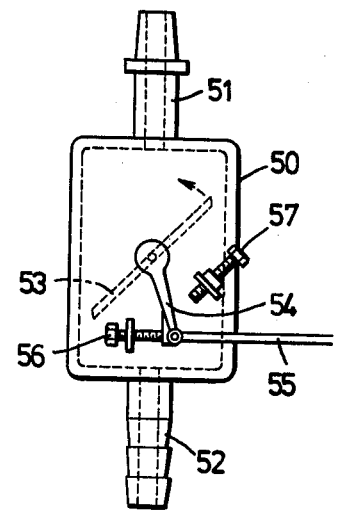
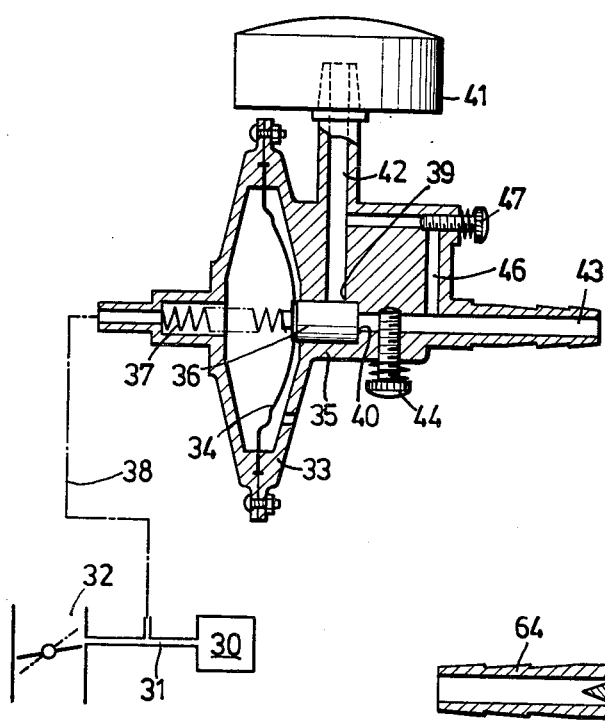
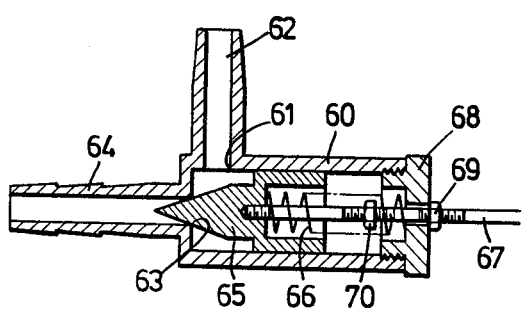

ROTARY INTERNAL COMBUSTION ENGINE

The present invention relates to rotary internal combustion engines, and more particularly, to a rotary internal combustion engine which exhausts clean waste gas.

In the conventional reciprocal engine, it is known, for example, as CVCC engine (Compound Vortex Controlled Combustion engine) of Honda Motors, Japan, that the combustion is spread from comparatively rich fuel-air mixture (containing relatively small amount of air) to comparatively lean fuel-air mixture in the combustion chamber so as to reduce harmful contents such as carbon monoxide (CO), hydrocarbon (HC) and nitrogen oxides ($NO_x$) in the exhaust gas.

According to a rotary engine of the prior art, a pair of recesses are provided in each arch-like face of the outer periphery of rotor so as to communicate with each other through a narrow groove. Further, first and second fuel intakes are provided in the housing for supplying the combustion chamber with relatively rich and lean fuel-air mixtures, respectively. The rich mixture is supplied in one of the recesses, while the lean mixture in the other, whereby the mixtures are compressed in the combustion chamber in two different layers having different density, and the flame or torch spreads from richer fuel layer to leaner fuel layer.

In this rotary engine, however, a timing control mechanism is indispensable so as to supply the separate recesses with fuel-air mixture of different density. Moreover, the shape of the recesses is not suitable for increasing the power output of the engine and for effective spreading of torch or flame.

On the other hand, according to another prior art engine of the same inventor as the present invention, there is disclosed a rotary engine in which first and second recesses are provided in each arch-like peripheral face of the rotor and an air intake port is provided in the side wall of the housing so as to be opened and closed by the side face of the rotor. The air supplied from the air intake port dilutes comparatively dense fuel-air mixture supplied from a fuel port into the combustion chamber.

When this basic invention is applied to a practical rotary engine, various improvements will be required. For example, the position and shape of the air intake port should be devised so as to effectively form two separate, richer and leaner fuel layers in the combustion chamber. Also the configuration of the recess should be developed so as to increase the power output of the engine. Further, the supply amount of air should be controlled so as to ensure smooth cruising.

According to the present invention, there is proposed a rotary engine comprising a housing having trochoidal inner periphery, a substantially triangular rotor having three arch-like peripheral faces and rotatably mounted in the housing so that three corners thereof keep contacts to the trochoidal inner periphery of the housing, a spoon-like recess provided in each arch-like peripheral face of the rotor, a fuel-air mixture intake port provided in the housing, and an elongated air intake port provided in the side wall of the housing so that the port is opened and closed by the side face of the rotor according to the rotation thereof. The air intake port is positioned relatively rearwardly of a combustion chamber defined by the trochoidal inner periphery of the housing and each of the arch-like peripheral faces of the rotor.

Accordingly, it is an object of the present invention to provide a rotary engine which enables reduction of harmful contents, especially, hydrocarbon and carbon monoxide in the exhaust gas by effectively forming richer and leaner fuel layers in the combustion chamber.

Another object of the present invention is to provide a rotary engine which has greater power output despite of higher anti-pollution characteristics.

Further object of the present invention is to provide a rotary engine in which torch or flame produced by the combustion of richer fuel effectively spreads to leaner fuel for the efficient combustion of the latter, thereby further reducing harmful contents in the exhaust gas.

Other objects and features of the present invention will be apparent from the following description of the invention with reference to the accompanying drawings, in which:

FIGS. 5 through 10 are explanatory diagrams for the operation of a rotary engine of the present invention;

FIG. 11 is a vertical section of an air control device;

FIG. 12 is a front view of another air control device; and

FIG. 13 is a longitudinal section of still another air control device.

Throughout the drawings, similar parts and elements are designated by the similar reference numerals and letters.

Figure 1:
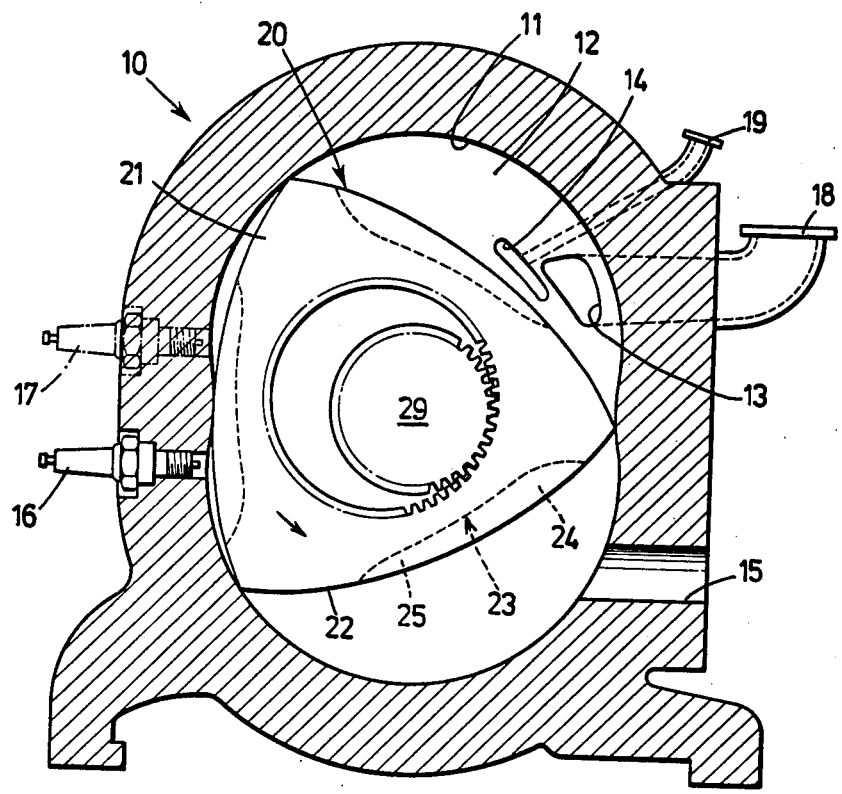
FIG. 1 is a vertical sectional view showing a rotary engine of the present invention.
Figure 2:
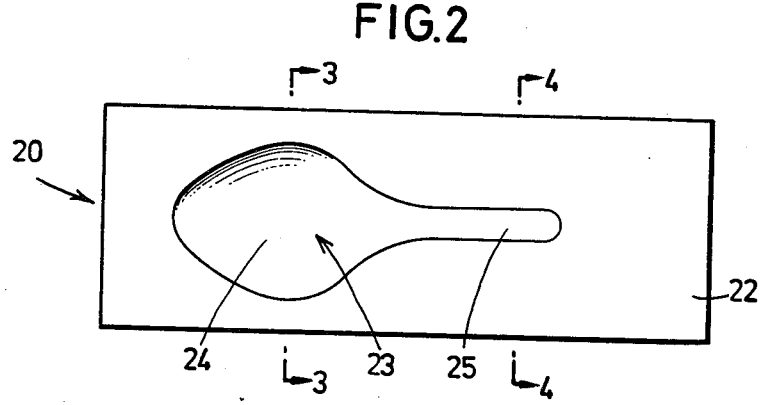
FIG. 2 is a plan view of a rotor.
Figures 3, 4:
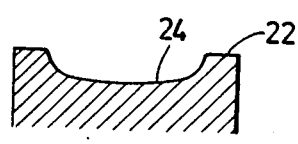
FIG. 3 is a sectional view along the line 3—3 of FIG. 2.
FIG. 4 is a sectional view along the line 4—4 of FIG. 2.

Referring now to FIG. 1, a rotary engine of the invention comprises a housing 10 having a trochoidal inner periphery 11 and a substantially triangular rotor 20 rotatably mounted within the housing 10. In the side wall 12 of the housing 10 is provided a fuel-air mixture (hereinafter referred to as only "fuel") intake port 13 and an air intake port 14. To the port 13 is connected a fuel intake manifold 18. To the port 14 is connected a pipe 19 communicating with the air.

In the lower portion of the housing 10 is provided an exhaust port 15.

On the housing 10 are fixed leading ignition plug 16 and trailing ignition plug 17, respectively. However, the trailing plug 17 may be omitted. In this case, the leading plug 16 may be actuated twice in succession.

The rotor 20 rotates counterclockwise in toothed engagement with a rotary shaft 29. During the rotation, three corners of the rotor 20 are continuously contacting to the trochoidal inner periphery 11, and side face 21 of the rotor is air-tightly contacting to the inner face of the side wall 12 of the housing. Therefore, the air intake port 14 is opened or closed by the side face 21 of the rotor 20 according to its rotation.

As best seen in FIG. 1, the air intake port 14 is elongated and inclined downwardly towards the right adjacent the fuel port 13. Preferably, the upper end of the air intake port 14 positions above the upper end of the fuel port 13. This means that after the fuel port 13 is closed by the side face 21 of the rotor, the air intake port 14 is still open at its upper end portion, as hereinafter explained with reference to FIG. 8.

In FIG. 1, the fuel port 13 is provided in the side wall 12 of the housing 10. This structure is generally called side port type. Although not shown in the drawings, however, the fuel port may be provided in the peripheral wall of the housing 10. The latter is called peripheral port type.

As appears from FIGS. 1 through 4, in each arch-like face 22 of the rotor 20 is provided a recess 23 which is of spoon-like shape having a larger depression 24 and an elongated groove 25 extending therefrom. As best seen in FIG. 1, lengthwise central section of the recess 23 is of such a shape that the depression 24 is deeper and the depth becomes gradually shallower in a slow slope towards the end of the groove 25. Further the cross section of the recess 23 is semi-circular or arch-shaped, as seen from FIGS. 3 and 4.

Figure 5:
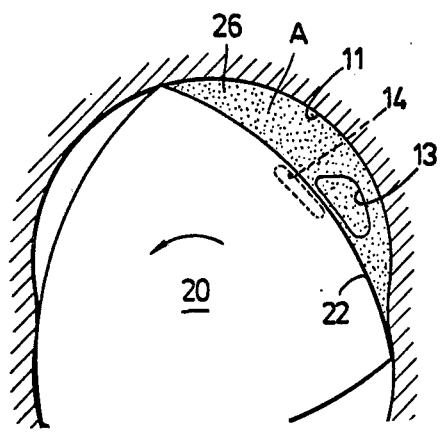

In operation of the rotary engine of the present invention, at the beginning of fuel suction process, the fuel port 13 is gradually opened by the side face 21 of the rotor 20, and richer fuel A (fuel-air mixture containing relatively small amount of air) is introduced in a chamber 26 which is defined by the arch-shaped face 22 and the inner periphery 11 of the housing 10, as shown in FIG. 5. At this time, the air intake port 14 is closed by the side face of the rotor 20.

Figure 6:
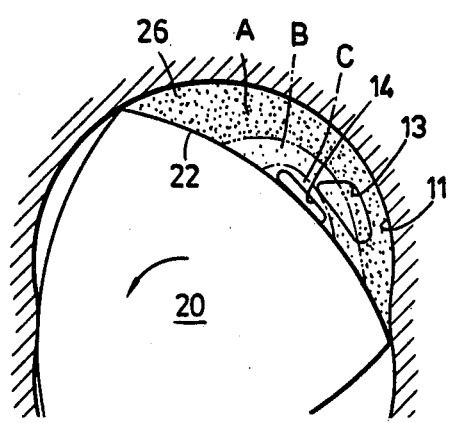

According as the rotor 20 rotates, the face 22 of the rotor passes the air intake port 14 to permit it to gradually open to the chamber 26, and finally, as shown in FIG. 6, the air intake port 14 is completely open. During the process, the air is gradually introduced by the vacuum in the chamber 26 to dilute the fuel about the port 14, thus forming leaner fuel layer B containing sufficient oxigen. At this time, since the port 14 is elongated, the elongated layer B substantially analogous to the port 14 is formed therearound. This is preferable for the formation of layer B at the rear half of the chamber 26 since it is also elongated.

Further a layer C containing almost only the air is formed adjacent the air intake port 14.

Figure 7:
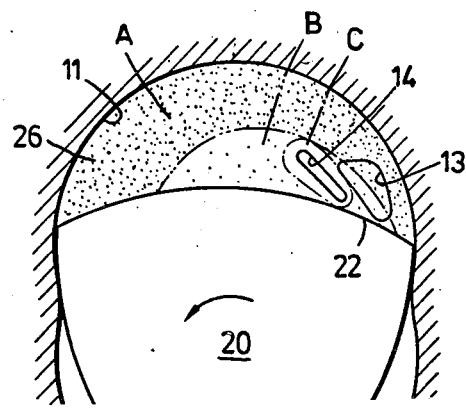
Figure 8:
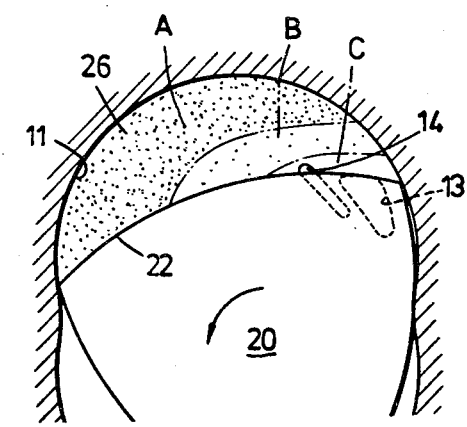

As shown in FIG. 7, according to the further rotation of the rotor 20, the air intake port 14 positions relatively at the rear portion of the chamber 26. The air introduced from the port 14 dilutes the fuel. As a result, the leaner layer B gradually extends towards the trailing portion of the chamber 26. Then, as the arch-like face 22 of the rotor 20 approaches the upper end of the fuel port 13 which is thereby gradually closed, the rear end portion of the chamber 26 is filled with the leaner fuel layer B. The last process of this is shown in FIG. 8, wherein the fuel port 13 is completely closed. At this time, it is preferable that the upper end portion of the air intake port 14 is still open, whereby the air introduced therefrom dilutes the fuel still remaining at the rear end portion of the chamber 26 to form uniformly diluted leaner layer B.

As will be understood from the above, the ratio of richer fuel layer A to leaner fuel layer B can be controlled by the length of the elongated air intake port 14 and the position of each end of the port 14.

Figure 9:
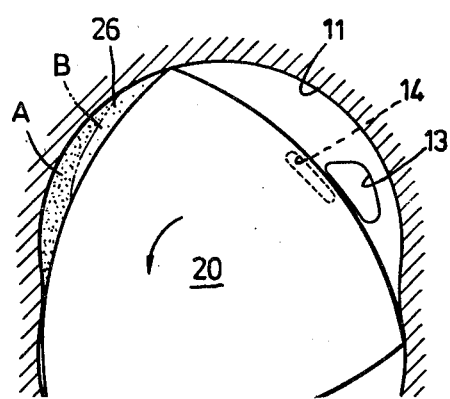

The rotor 20 rotates further to compression process, as shown in FIG. 9. During the process, the air layer C is mixed in the leaner fuel layer B.

In the last process of compression, as shown in FIG. 10, the middle portion of the arch-like face 22 almost contacts to the projecting portion of the inner periphery 11. Concurrently, the plug 16 ignites the fuel. The combustion spreads from richer fuel A to leaner fuel B as indicated by the dotted arrow since the groove 25 communicating with the depression 24 permits the torch or flame to run. Further, the smooth slope of the bottom of the recess 23 allows the torch to readily spread. Still further, the torch will not be cooled since the groove 25 is narrow and shallow.

Moreover, the throttle portion at the conjunction between the depression 24 and the groove 25 has a venturi-effect to accelerate the torch or flame, thereby enabling the torch to run to the corner of the chamber 26. As a result, carbon monoxide, hydrocarbon and the like generated by the combustion of richer fuel A is completely burned together with the leaner fuel B containing sufficient oxygen.

Further, the power output is increased since wide and deep depression 24 is provided in the leading portion of the face 22 of the rotor 20 and a greater rotational torque is applied thereto upon combustion and expansion of the richer fuel A.

Meanwhile, during idling and deceleration of the engine, the vacuum thereof will be of a comparatively high magnitude, while during acceleration and higher cruising speeds, the vacuum is reduced. As a result, during idling, the air inflow from the air intake port 14 increases, while it is reduced during acceleration.

On the other hand, during idling, a throttle valve in a carburettor is narrow and a comparatively small amount of fuel is supplied to the fuel port 13. During acceleration, the throttle valve is opened widely and larger amount of fuel is introduced in the engine. Therefore, during idling, the air is too much for the fuel, thereby causing unusual condition such as irregular rotation, while the air is insufficient during acceleration.

In order to solve the above problem, an adjustable valve means might be mounted in the pipe 19 (FIG. 1) communicating with the air intake port 14. However, the results are the same as those without the valve means, because if the air flow is adjusted so as to meet the fuel supply during idling, the air may be more insufficient during acceleration. On the contrary, when the air flow is adjusted so as to meet the fuel supply during acceleration, the air may be too much for the fuel during idling.

In order for the practicable solution of the above problem, and in order to attain smooth driving of the engine, there should be connected to the pipe 19 an air control device which enables adjustment of air supply amount so as to meet the operating mode of the engine.

Several embodiments of the air control device are described hereinafter with reference to FIGS. 11 to 13.

FIG. 11 shows an air flow control device utilizing vacuum of a vacuum ignition advancer. As illustrated, the vacuum advancer 30 is connected to a carburettor 32 through a conduit 31. It is known that the vacuum in the conduit 31 becomes higher during acceleration or higher cruising speeds of the engine. The air control device of FIG. 11 is adapted to control the air flow by the action of diaphragm communicating with the vacuum in the conduit 31.

As shown, a diaphragm 34 is mounted in a casing 33. A cylinder 35 is connected to the casing 33 in communication with the center thereof. A piston 36 is slidably inserted in the cylinder 35 and is connected to one side of the diaphragm 34. To the other side of the diaphragm is connected a spring 37 urging the piston 36 rightwardly. Further, at the side of spring 37, the casing 33 communicates with the vacuum of conduit 31 through a conduit 38.

In the cylinder 35 are provided a first port 39 and a second port 40. The first port 39 communicates with an air intake pipe 42 having an air filter 41. The second port 40 is connected to an air supply pipe 43, which is connected to the pipe 19 of the air intake port 14 (FIG. 1) by means of a suitable conduit. The air intake pipe 42 and air supply pipe 43 communicate with each other by a bypass 46.

In operation of the air control device, during idling of the engine, the vacuum of advancer 30 is low and cannot suction the diaphragm 34. Therefore, the spring 37 is forcing the piston 36 rightwardly, and the ports 39, 40 are closed. As a result, the air introduced from the air intake pipe 42 is supplied to the engine through the bypass 46 and supply pipe 43. During idling of the engine, smaller amount of fuel is supplied to the engine, as mentioned before. Therefore, by adjusting a throttle valve 47, the air flow is controlled so as to meet the fuel amount and so as not to cause irregular rotation or the like.

During acceleration or higher cruising speeds, the vacuum acting on the advancer 30 is high, and suctions the diaphragm 34, whereby the piston 36 slides leftwardly to open the ports 39 and 40. Thus, the pipe 42 and pipe 43 communicate with each other through the ports 39 and 40. During acceleration, larger amount of fuel is supplied to the engine. Then, a throttle valve 44 is adjusted so as to meet the amount of fuel.

FIG. 12 illustrates an air control device in which the air flow is adjusted mechanically in response to an accelerator pedal.

As shown, a box 50 has an air intake pipe 51 and an air supply pipe 52 which is connected to the pipe 19 of the air intake port 14 of FIG. 1. In the box 50 is mounted a valve 53. To the rotary shaft of the valve 53 is connected an arm 54 at the outside of the box 50. To the outer end of the arm 54 is connected a wire or linkage 55 which is in turn connected to an accelerator pedal (not shown). By forcing the pedal down, the valve 54 is opened through the linkage 55 and arm 54.

On the side wall of the box 50 are provided first adjustable stop 56 and second adjustable stop 57 for defining the rotation of arm 54, i.e., for adjusting the minimum and maximum opening rate of the valve 50.

In operation of the device, during idling, the accelerator pedal is not operated. Therefore, the valve 53 maintains initial position as shown in FIG. 12. At this time, the stop 56 is adjusted so that the inflow of air meets the amount of fuel supplied during idling so as not to cause irregular rotation of engine.

During acceleration, the accelerator pedal is forced down to cause the valve 53 to widely open, thereby increasing the air inflow so as to meet the relatively large amount of fuel supplied to the engine. The air flow is adjusted by the stop 57.

FIG. 13 shows an air control device substantially similar to the device of FIG. 12. As appears, a cylinder 60 is provided with a first port 61 connected to an air intake pipe 62 and a second port 63 connected to an air supply pipe 64 which is to be connected to the pipe 18 of the air intake port 14 (FIG. 1). In the cylinder 60 is slidably inserted a piston 65 having conical end for adjusting the air flow at the port 63. The piston 65 is biased towards the port 63 by means of a spring 66. To the piston 65 is connected a screw rod 67 which extends outwardly of the cylinder 60 through a cap 68 threaded in one end of the cylinder.

The rod 67 is connected to an accelerator pedal (not shown) through a wire or linkage. By forcing the pedal down, the rod 67 is pulled rightwardly together with the piston 65. The rod 67 is threaded with first and second nuts 69 and 70 for adjusting minimum and maximum opening rate of the port 63, respectively, so as to meet the fuel amount during idling and acceleration. The operation of the device is substantially the same as that of the device of FIG. 12.

According to the present invention as hereinbefore described, richer and leaner fuel layers are efficiently formed in the combustion chamber. As a result, harmful contents in the exhaust gas can be greatly reduced.

Further, the air added to the fuel is controlled in accordance with operating mode of the engine, thereby enabling smooth driving as well as increase of power output.

What I claim is:

1. A rotary internal combustion engine operated by an accelerator pedal, comprising:
   (a) a housing (10) having a trochoidal inner periphery (11) with spark plug ignition means (16, 17) therein;
   (b) a substantially triangular rotor (20) having three arch-like peripheral faces and rotatably mounted within the housing;
   (c) a recess (23) of substantially elongated spoon-like shape in each of the peripheral faces of the rotor;
   (d) a fuel port (13) for supplying fuel from a fuel source, in the housing in communication therewithin;
   (e) a vacuum ignition advance connected to said spark plug ignition means;
   (f) a diaphragm (34) operatively coupled to said vacuum ignition advance to be operated by the vacuum thereof; a piston (36) slidable within a cylinder (35) connected to the diaphragm (34);
   (g) an elongated air intake port (14) in the side wall of the housing so as to be opened and closed by a side face of the rotor according to the rotation thereof, said air intake port being elongated and inclined in the direction of rotation of said rotor and so disposed at a relative position that it gradually moves towards the rear end portion of a combustion chamber which is defined by the inner periphery of the housing and each of the peripheral faces of the rotor;
   (h) an air intake passage communicating with the cylinder;
   (i) an air supply passage communicating with the cylinder and connected to said air intake port (14);
   (j) a bypass (46) communicating the air intake passage with the air supply passage, a first valve means mounted in the bypass for adjusting the air flow passing therethrough, and a second valve means mounted in the air supply passage upstream of the conjunction of the bypass, the piston (36) being adapted and disposed to block communication between the air intake passage and the air supply passage through the cylinder when the vacuum is relatively low, while to permit communication when the vacuum is relatively high.

* * * * *